United States Patent [19]
Nishioka

[11] 3,708,252
[45] Jan. 2, 1973

[54] ROTARY MECHANISM
[76] Inventor: Hideki Nishioka, 1745 Isshiki, Hayama-cho, Miura-gun, Kanagawa-ken, Japan
[22] Filed: July 1, 1971
[21] Appl. No.: 158,966

[30] Foreign Application Priority Data
July 1, 1970 Japan..............................45/57117

[52] U.S. Cl...............................................418/195
[51] Int. Cl..............F01c 1/08, F03c 3/00, F04c 1/14
[58] Field of Search.........................418/195, 205, 68

[56] References Cited
UNITED STATES PATENTS
3,040,664   6/1962   Hartley................................418/195

Primary Examiner—William L. Freeh
Attorney—Kemon, Palmer & Estabrook

[57] ABSTRACT

A rotary mechanism adapted for use with a rotary compressor or rotary engine which comprises a housing constituting a spherical chamber and a pair of rotary members including a pair of conical members coupled together by coupling spherical member so as to be rotatably received in said spherical chamber.

1 Claim, 4 Drawing Figures

ROTARY MECHANISM

This invention relates to a rotary mechanism and more particularly, though not limited, to a rotary mechanism adapted for use with a rotary compressor or rotary engine.

A rotary mechanism is known to be more advantageous in many respects than a reciprocating type. However, a rotary engine known to date is generally of complicated construction and likely to give rise to failure and increase manufacturing cost.

It is accordingly the object of this invention to provide a durable rotary mechanism of relatively simple construction which is capable of a prominently effective performance.

The present invention can be more fully understood from the following detailed description when taken in conjunction with reference to the appended drawings, in which.

Figure 1:
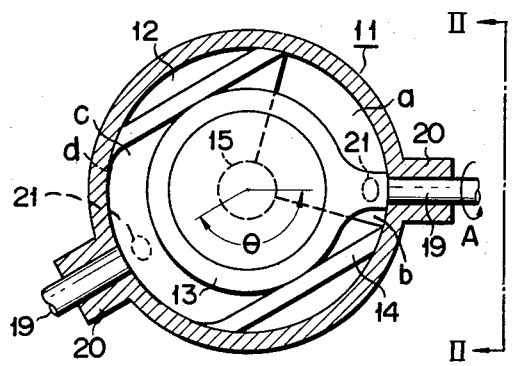
FIG. 1 is a sectional view of a rotary compressor using a rotary mechanism of this invention.
Figure 2:
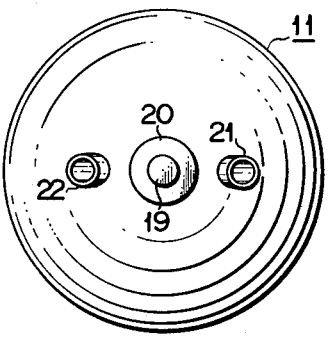
FIG. 2 is an elevation of said mechanism as viewed from line II—II of FIG. 1.
Figure 3:
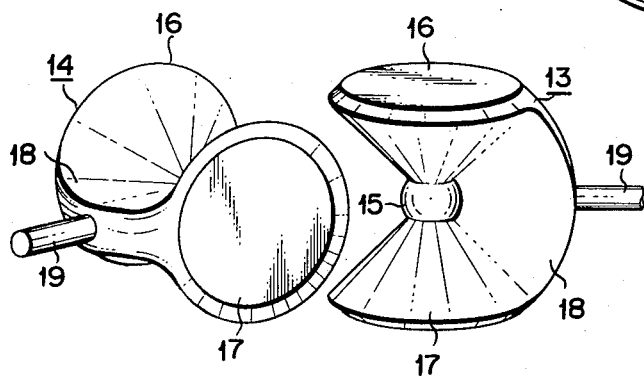
FIG. 3 is a perspective view of a rotary member used in the invention.

There will now be described by reference to FIGS. 1 to 3 a rotary compressor using a rotary mechanism according to this invention. Numeral 11 denotes a housing constituting a spherical chamber 12 which is splittable in two parts, though not shown. Numerals 13 and 14 show a pair of rotary members coupled together by a spherical member 15 disposed at the center of said spherical chamber 12 so as to act as a common center of rotation of said rotary members. Each of said paired rotary members 13 and 14 include a pair of round truncated conical members 16 and 17. The apical surface of each conical member abuts on said common spherical member slidably and in airtight relationship, the bottom peripheral edge thereof is pressed against the inner wall of said spherical chamber 12 in a similar manner, and the top portion thereof defines a vertical angle of 90° coaxially with an imaginary line passing through the center of said spherical chamber 12. There is also provided a partitioning plate member 18 which is disposed in a plane including an imaginary line passing through said paired conical members 16 and 17 and the center of said spherical chamber 12. Said partitioning plate member 18 has a truncated sectorial form, the top or apical part of which abuts on the outer peripheral surface of the coupling spherical member slidably and in airtight relationship and the outer edge of which is pressed against the inner walls of said spherical chamber 11 in a similar manner. Both sides of said partitioning plate member 18 are fixed on the peripheral surfaces of said conical members 16 and 17 so as to couple them together. These conical members 16 and 17 and partitioning plate member 18 may be integrally fabricated, for example, by molding from proper wear-resistant material. To said paired rotary members is fitted a shaft 19 disposed at right angles to the common axis of said paired conical members 16 and 17, the inner end of which is connected to the center of the outer edge of the partitioning plate member 18 and the outer end of which is rotatably inserted into a journal box 20 provided in the housing 11 for connection with a motor (not shown). As described above, said paired rotary members 13 and 14 are rotatably coupled together by the common coupling spherical member 15. The shafts 19 of both rotary members are so disposed as to define an angle of less than 180°. Thus said four conical members and the partitioning plate members define within said spherical chamber 12 four compartments $a$, $b$, $c$ and $d$ whose volumes can be varied according to the rotation of said rotary members.

In the housing 11 are perforated a plurality of sets of supply and delivery ports 21 and 22, each set of supply and delivery ports being so disposed as to have the journal box 20 interposed therebetween.

When said paired rotary members 13 and 14 are rotated by motor in the direction of A (FIG. 1), the compartment a begins suction through a port 21. After rotating substantially 180°, said rotary members 13 and 14 are shifted to a compression stage to expel compressed gas through a port 22, and returned to their original position, completing one cycle of operation. Said cycle is conducted in the same manner with respect to all the compartments $a$, $b$, $c$ and $d$. It will be apparent, therefore, that either of said ports 21 and 22 can be used for supply or delivery according to the rotating direction of said rotary members 13 and 14.

The compression ratio of this compressor is determined by the angle $\theta$ defined by the shafts 19 of said paired rotary members 13 and 14. Selection of said angle can provide a compressor performing compression in any desired ratio.

Adaptability of the rotary mechanism of this invention to an internal combustion engine will be clearly understood from the foregoing description of the arrangement and operation of the aforesaid compressor.

Figure 4:
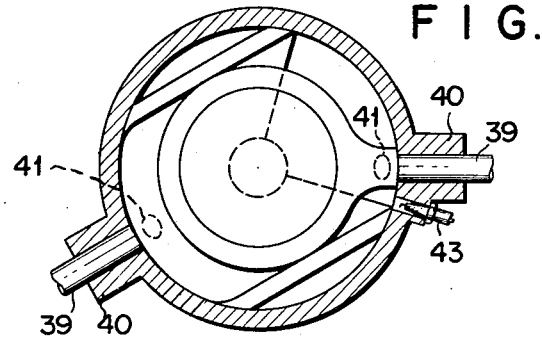
FIG. 4 is a sectional view of a rotary engine using the rotary mechanism of the invention.

If, as shown in FIG. 4, there is provided an ignition plug 43 near a journal box 40, and supply ports 41 and delivery ports (not shown) are each fitted with a valve (not shown) operable at a prescribed interval in synchronization with the rotation of the paired rotary members, then the aforesaid object will be easily attained, enabling drive power to be drawn out from one or both of the shafts of said paired rotary members.

What I claim is:

1. A rotary mechanism comprising:
   1. a housing defining a spherical chamber;
   2. a coupling spherical member disposed at the center of said spherical chamber;
   3. a pair of rotary members received in said spherical chamber, each rotary member including
      a. a pair of round truncated conical members whose apical surface abuts on the coupling spherical member slidably and in airtight relationship, whose bottom peripheral edge is pressed against the inner walls of said spherical chamber in a similar manner and whose top portion defines a vertical angle of 90° coaxially with an imaginary line passing through the spherical center,
      b. a partitioning plate member disposed in a plane including said imaginary line passing through the spherical center and shaped like a truncated sectorial form, whose apical surface contacts the outer peripheral surface of said coupling spherical member, whose outer edge abuts against the inner walls of said spherical chamber slidably and in airtight relationship and both sides of which are fixed on the peripheral surface of said paired truncated conical members so as to couple said members together, and c. a shaft fixed at one end to said partitioning plate member, extended at right angles to the axis of said paired conical members and penetrating said spherical chamber housing so as to rotatably support said paired rotary members, wherein a pair of said rotary members rotatably engage said common coupling spherical member with the shafts thereof so disposed as to define an angle of less than 180° and thus four conical members and two partition wall members define four compartments whose volumes can be varied according to the rotation of said two sets of paired rotary members; and 4. a plurality of sets of supply and delivery ports of fluid communicable with said four compartments, each set of supply and delivery ports being so arranged as to have said shaft interposed therebetween.

* * * * *